(12) United States Patent
Sparrow (10) Patent No.: US 6,896,276 B1
(45) Date of Patent: May 24, 2005

(54) ANTI-DIVE FRONT SUSPENSION (75) Inventor: Roger Lionel David Sparrow, Surrey (GB)

(73) Assignee: Ultimate Sports Engineering Limited, West Sussex (GB)

( * ) Notice: Subject to any disclaimer, the term of this patent is extended or adjusted under 35 U.S.C. 154(b) by 0 days.

(21) Appl. No.: 09/786,871
(22) PCT Filed: Sep. 7, 1999
(86) PCT No.: PCT/GB99/02963
§ 371 (c)(1), (2), (4) Date: Mar. 9, 2001
(87) PCT Pub. No.: WO00/13961
PCT Pub. Date: Mar. 16, 2000

(30) Foreign Application Priority Data

Sep. 9, 1998 (GB) .............................. 9819649

(51) Int. Cl.[7] .............................................. B62K 21/02
(52) U.S. Cl. ...................... 280/276; 280/275; 280/283
(58) Field of Search ............................... 280/276, 277, 280/124.104, 275, 283; 180/219

(56) References Cited

U.S. PATENT DOCUMENTS

| 4,159,123 A | * | 6/1979 | Petty .......................... 280/276 |
| 4,542,910 A | * | 9/1985 | Watanabe ..................... 280/276 |
| 5,299,820 A | * | 4/1994 | Lawwill ....................... 280/277 |
| 5,431,426 A | * | 7/1995 | Ijams et al. .................. 280/276 |
| 5,462,302 A | * | 10/1995 | Leitner ........................ 280/277 |
| 5,899,478 A | * | 5/1999 | Watanabe ..................... 280/276 |
| 5,931,487 A | | 8/1999 | Koppelberg et al. |
| 6,036,211 A | * | 3/2000 | Nohr ........................... 280/276 |

FOREIGN PATENT DOCUMENTS

| DE | 3133576 A1 | 5/1983 |
| DE | 3833880 A1 | 4/1990 |
| GB | 2 052 407 A | 2/1980 |
| WO | WO 95/23728 | 9/1995 |

* cited by examiner

Primary Examiner—Lesley D. Morris
Assistant Examiner—L. Lum
(74) Attorney, Agent, or Firm—Fulwider Patton Lee & Utecht, LLP (57) ABSTRACT The forks of a bicycle are carried by a head tube shaft and are angled forward and comprise two outer support tubes, one on either side of the wheel. An inner suspension tube is telescopically housed in the outer tube and connects to the wheel axle. A suspension spring within the outer tube urges down. A torque reaction arm is journalled on the axle and carries a brake calliper within which passes a brake disc. At the rear end of the arm, a rear link is pivotally connected and leads up to an upper pivot point on the outer tube. Application of braking torque causes the rear link to act upwards on the outer tube, providing anti-dive.

18 Claims, 6 Drawing Sheets

ANTI-DIVE FRONT SUSPENSION

The present invention relates to anti-dive front suspension, particularly though not exclusively for a pedal bicycle. It is envisaged that the invention will find application in a motor bicycle.

Anti-dive front suspension is known for cars and indeed for motor bicycle and pedal bicycles. In motor bicycles, complex hydraulic arrangements are known for stiffening the suspension under braking, to react to the weight transfer to the front wheels that accompanies braking and leads to suspension dive. Such arrangements are not suitable for pedal bicycles.

Various arrangements are known for modifying bicycle front suspension to provide anti-dive. In particular, U.S. Pat. No. No. 4,159,123 teaches for a motor bicycle, use of a torque arm mounted on the front wheel and secured to the brake plate. A rod extends straight up between the rear end of the torque arm and brackets on the upper fork tube, so that when braking action is applied to the front brake, the brake plate applies a torque to the torque arm which is translated into a force resisting dive. This arrangement does not lend itself to use on mountain bicycles, due to the brackets being set back from the tubes, where there is little clearance from the frame of the bicycle. Further the rod is liable to be cumbersome and vulnerable.

The object of the present invention is to provide improved anti-dive suspension for bicycles.

According to the invention there is provided.

An anti-dive front suspension for a bicycle, comprising:
- a suspension support member adapted to be steeringly mounted in the bicycle,
- a torque reaction arm carrying a front wheel brake, braking torque being reacted to the arm,
- means for connecting a forward portion of the torque reaction arm to the suspension support member,
- a front wheel axle carried by the connecting means or the torque reaction arm,
- a suspension spring acting between the suspension support member and the connecting means or the torque reaction arm, the spring being loaded by wheel load tending to close the suspension, and
- a rear link extending obliquely from the suspension support member to a rear end of the torque reaction arm where it is pivotally connected thereto, the connecting means and the rear link holding the torque reaction arm with a fore and aft component of direction in the bicycle (when steered straight ahead);

the arrangement being such that braking torque applied to the reaction arm tends to rotate it to lift its rear end and open the suspension in an anti-dive manner.

Particularly where as preferred, the rear link is connected to the suspension support member at a point within the tyre radius and preferably within the rim radius of the front wheel, the arrangement of the rear link at an oblique orientation provides a compact, robust suspension.

Additionally, the torque reaction member is preferably angled forwardly down, at least when the bicycle is unladen and preferably when it is laden by a rider.

Preferably, the rear link is shorter than the length of the torque reaction arm from the front wheel axle to its rear link pivotal connection to the rear link.

The invention is applicable to suspensions where the suspension support member is a single member cantilevered to one side of the front wheel. However, it is also applicable to the suspension support member being a fork having two fork members on respective sides of the front wheel.

Whilst, the front wheel axle can be carried at the connection of the torque reaction arm to the connecting means, in a particularly preferred embodiment, the front wheel axle is carried on the torque reaction arm in front of the connection of the torque reaction arm to the connecting means, the support member being angled back or cranked back from the head tube shaft to maintain castor trail.

It is envisaged that in our normal suspensions the connecting means will include a member slidably mounted on the suspension support member and pivotally connected to the torque reaction arm, preferably with the slidable member telescopically accommodated in the suspension support member and the spring accommodated within the suspension support member. In such suspensions, it will be usual for the rear link to be connected to the suspension support member at a point where the slidable member extends within the suspension support member.

In an alternative, the connecting means will comprise a front link pivotally connected between the suspension support member and the torque reaction arm. In these suspensions, the spring will normally act between the suspension support member and the rear link connection point of the torque reaction arm.

In many of the suspensions, where steering precision will be important, normal fork end location of the front will may not be adequate. To improve steering precision, the connecting means can include steering angle transmitting bearings at the ends of the rear link, and the front link where provided, for transmitting steering angle from the head tube shaft to the front wheel axle.

As a result of research into the geometry of the anti-dive suspension, we have found that an important factor in obtaining a satisfactory anti-dive suspension is the rate of change of the angle—referred to as "angle variance"—of the torque reaction arm with suspension stroke. If the angle variance is within the following range, the suspension is expected to exhibit a satisfactory degree of anti-dive to a large extent independent of factors such rider weight. Accordingly, the suspension geometry is preferably such that angle variance of the torque reaction arm is between 0.05° and 0.30° per mm wheel stroke. For pedal cycles, the preferred range is between 0.14° and 0.19° per mm; whereas for motorcycles it is between 0.09° and 0.13° per mm.

To help understanding of the invention, three specific embodiments of the invention will now be described by way of example and with reference to the accompanying drawings, in which.

Figure 1:
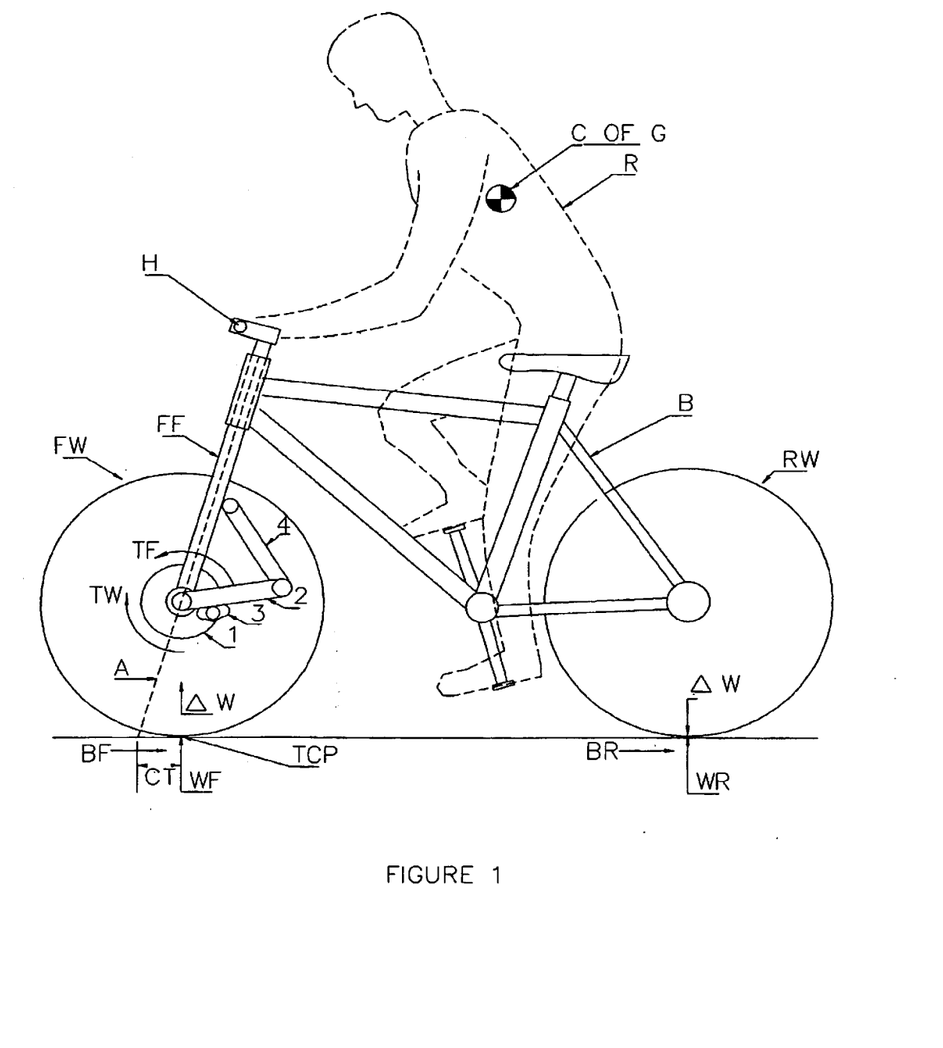
FIG. 1 is a diagrammatic side view of a bicycle under going braking.

Referring first to FIG. 1, the bicycle B thereshown has a rider R with his centre of gravity C of G at the general level of the handlebars H. Under braking, normal distribution of weight forces WF and WR at the front and rear respectively is altered by a transfer $\Delta W$ from the rear to the front. The quantum $\Delta W$ depends upon the sum of the braking forces BF and BR at the wheels FW, RW.

For a bicycle such as the invention is concerned with, where the front brake 1 is at the front hub—see in more detail below—the front brake force results from the exertion of a torque TW on the front wheel and an equal and opposite torque TF on the front forks FF. Anti-dive suspension utilises the torque TF, which is exerted in the direction such that the wheel FW is tending to drag the forks with it. The torque is applied to a torque reaction arm 2 by the brake 3 carried by the arm. It is reacted to the forks by a link 4—referred to as the "rear link" because it is behind the forks. The link extends up to an intermediate point on the forks. Under braking, the link exerts a lifting force on the forks. It is this force which provides the "anti-dive" characteristics. It will be appreciated that for a given braking torque, if the torque reaction arm 4 is lengthened, the lifting force will be reduced since it will be acting at a larger radius to produce the same torque.

Figure 3:
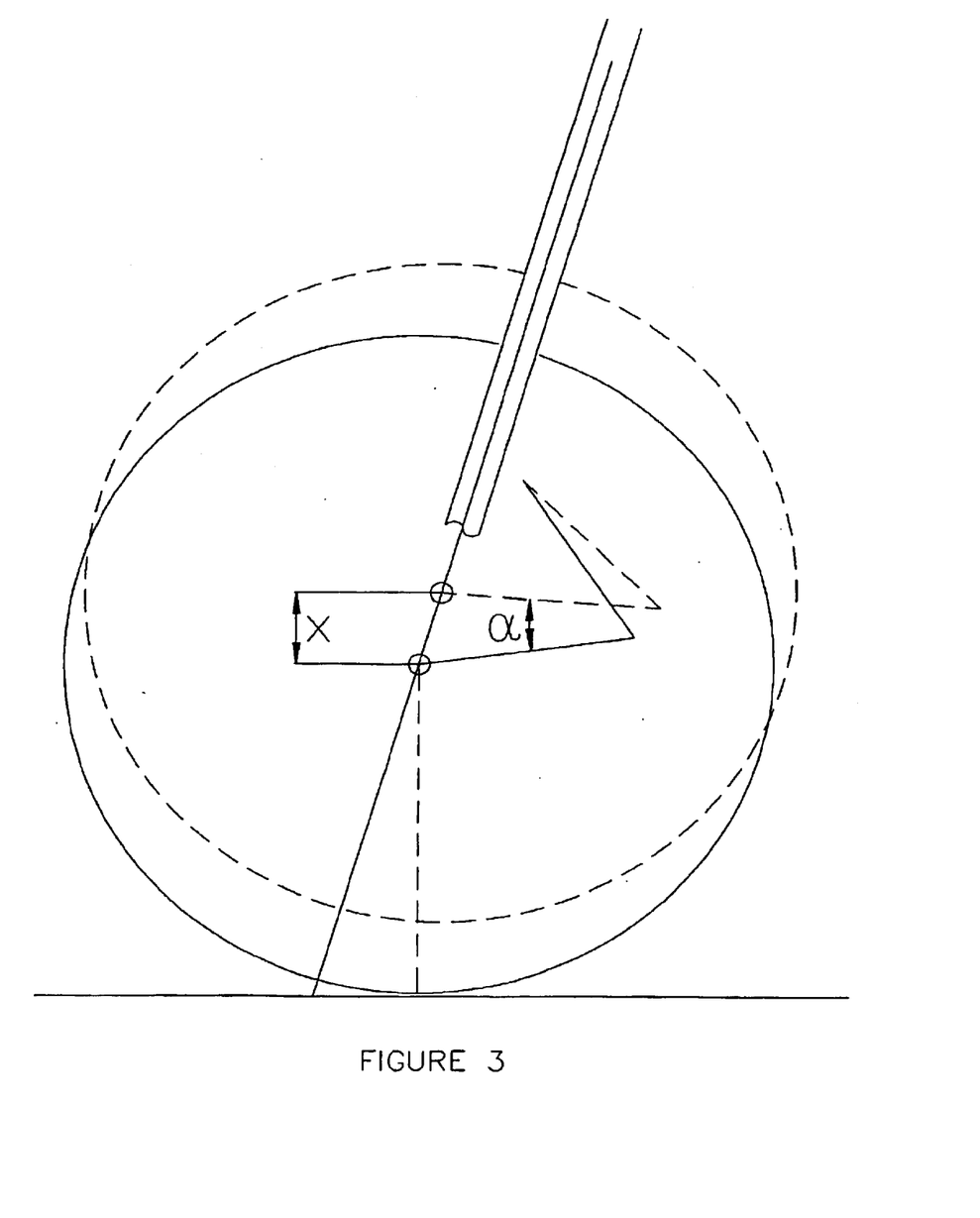
FIG. 3 is a diagrammatic view of the front suspension showing the anti-dive action.

The arrangement of the rear link to extend to an intermediate point on the forks, within the tyre rim, gives it an oblique orientation. Whilst lifting of the bottom end of the rear link does indeed cause the forks to be lifted, it is to an extent which is reduced below the full effect possible with a longer and vertical rear link. This attenuated effect provides a degree of anti-dive which represents a practical compromise between a suspension with no anti-dive and one having excessive anti-dive. This degree of anti-dive is associated with the rear link and the torque reaction member closing in the manner of a pair of scissors, that is to say both the rear link and the torque reaction arm change inclination to become more horizontal, closing the angle between them, as can be appreciated with reference to FIG. 3 below. It provides the desirable angle variance which is also referred to below.

Figure 2:
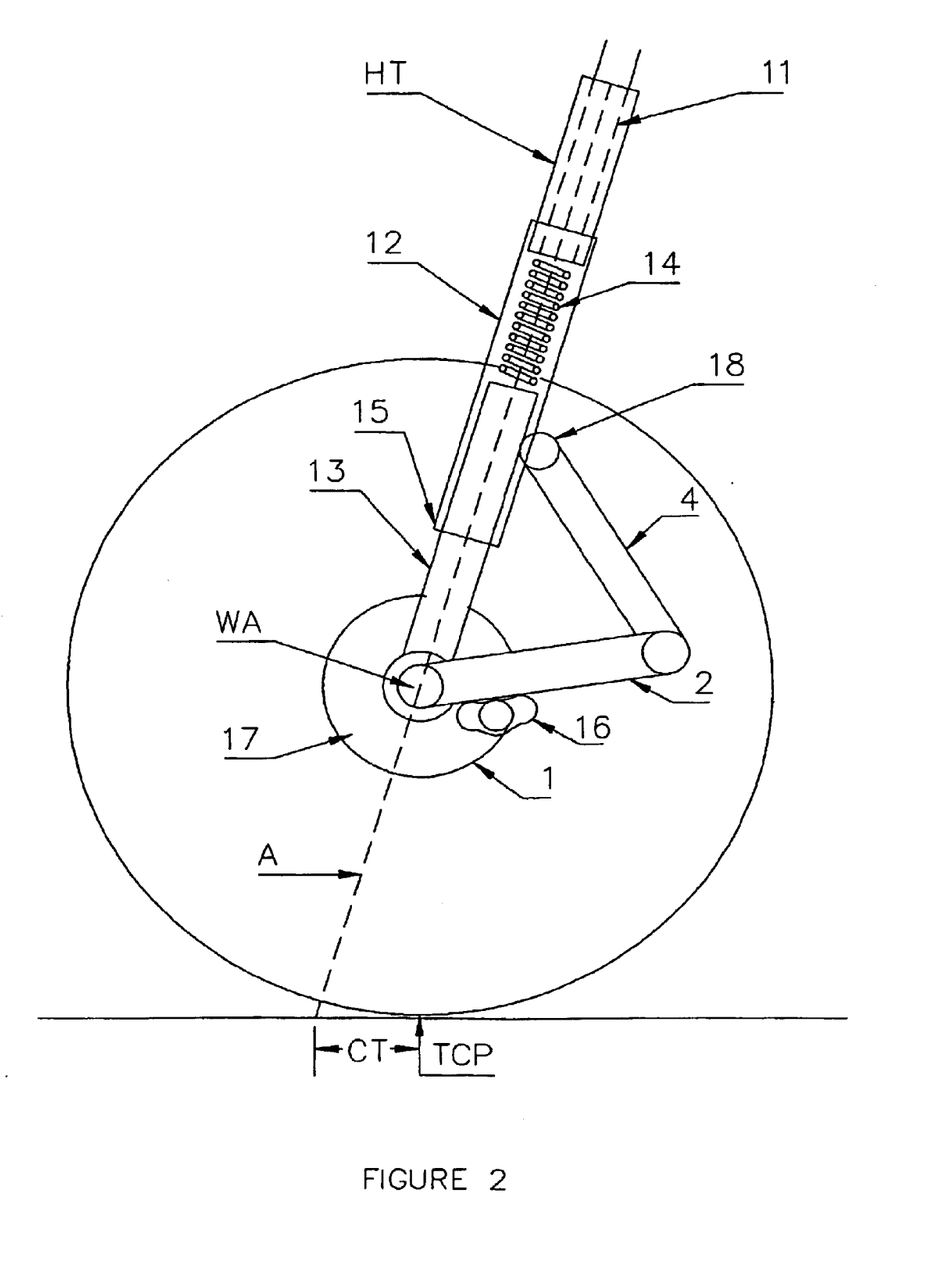
FIG. 2 is a side view of a front suspension in accordance with the invention, the suspension being shown removed from the bicycle.

Referring now in more detail to FIG. 2, the forks are carried by a head tube shaft 11, which is journalled in the head tube HT. The latter defines the steering axis A of the front wheel. This intersects the ground in front of the tyre contact patch TCP, in order to provide self-centring castor trail CT. The forks are angled forward and comprise two outer support tubes 12, one on either side of the wheel. The following description refers only to the brake side. An inner suspension tube 13 is telescopically housed in the outer tube 12 and connects to the wheel axle WA. A spring 14 within the outer tube urges down, against a rebound stop 15 at the bottom of the outer tube until the bicycle is ridden.

The torque reaction arm 2 is journalled on the axle WA and carries the brake calliper 16, within which passes the brake disc 17 attached to the wheel. At the rear end of the arm 2, the rear link is pivotally connected and leads up to an upper pivot point 18 on the outer tube. This is at a position where the inner tube telescopes within it and within the wheel rim. Thus the suspension is compact, with the rear link 4 being shorter than the torque reaction arm, but not considerably so. It should be noted that, with front wheel steered straight ahead, the torque reaction arm extends fore and aft in the bicycle, albeit with downwards inclination.

In normal suspension mode, the wheel may be deflected upwards, by a bump, by a distance x against the action of the spring. The rear link holds the rear end of the arm at a height with respect to the outer support tube which is substantially constant, but marginally higher, but moves out appreciably to accommodate the flattening of the downwards inclination of the arm. The latter changes its inclination by α. The rate of change of this angle with wheel stroke, that is the angle variance, is equal to α/x. We have learned that retaining the angle variance within the range 0.05° and 0.30° per mm and preferably between 0.14° and 0.19° per mm, provides satisfactory anti-dive characteristics for a pedal bicycle.

Figure 4:
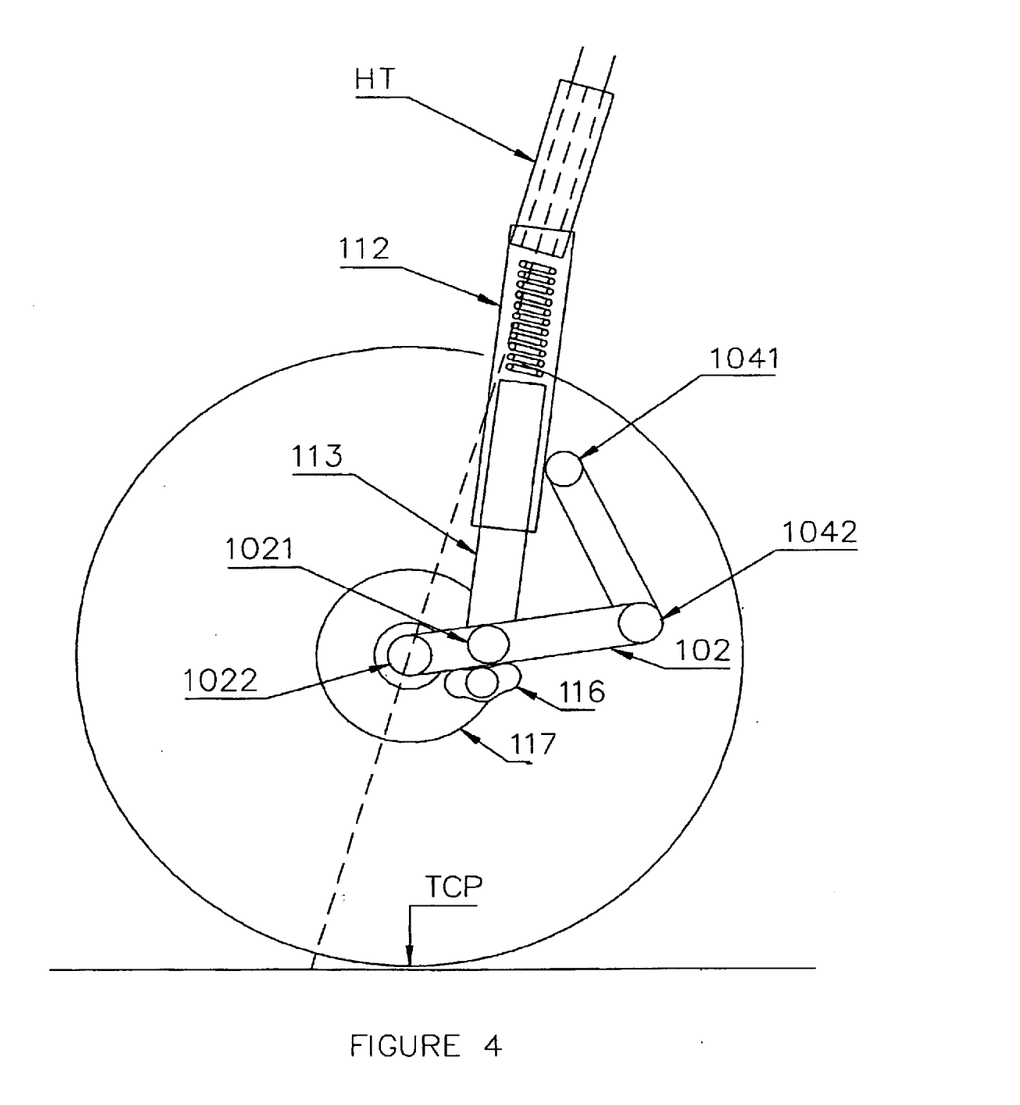
FIG. 4 is a side view of another suspension of the invention.

Turning now to FIG. 4, the suspension thereshown is single sided, that is to say that there is no counter-part fork on the other side of the wheel from the outer support tube 112 shown. This is cantilevered from the central plane of the bicycle and the head tube shaft. The inner tube 113 is pivotally connected to the torque reaction arm 102 at an intermediate point 1021. The wheel is carried at the forward end 1022 of the arm, for which reason the arm is referred to as a "leading arm". Placing the wheel forwards moves the tyre contact patch TCP forward with respect to the outer support tube. In order to provide the necessary castor trail, this tube 112 is angled more steeply than the head tube 1121, which in its turn is angled back more that usual.

A rear link 104 is provided similarly to the link 4. However, since the suspension is single-sided and the inner tube 113 is freely rotatable within the outer tube 112, steering angle cannot be transmitted to the wheel by these tubes alone. The pivot bearings 1041 of the rear link to the outer tube and 1042 of the rear link to the torque reaction arm are wide transversely of the fore and aft plane of the bicycle, whereby the link is steered and steers the torque reaction arm, which in turn steers the front wheel.

A brake 116, 117 is provided at the front of the arm 102. It acts on the arm in a similar manner with the link 104 providing anti-dive under braking. Although a leading arm, the anti-dive geometry and the angle variance effect are essentially similar to those of the suspension of FIGS. 2 & 3.

Figure 5:
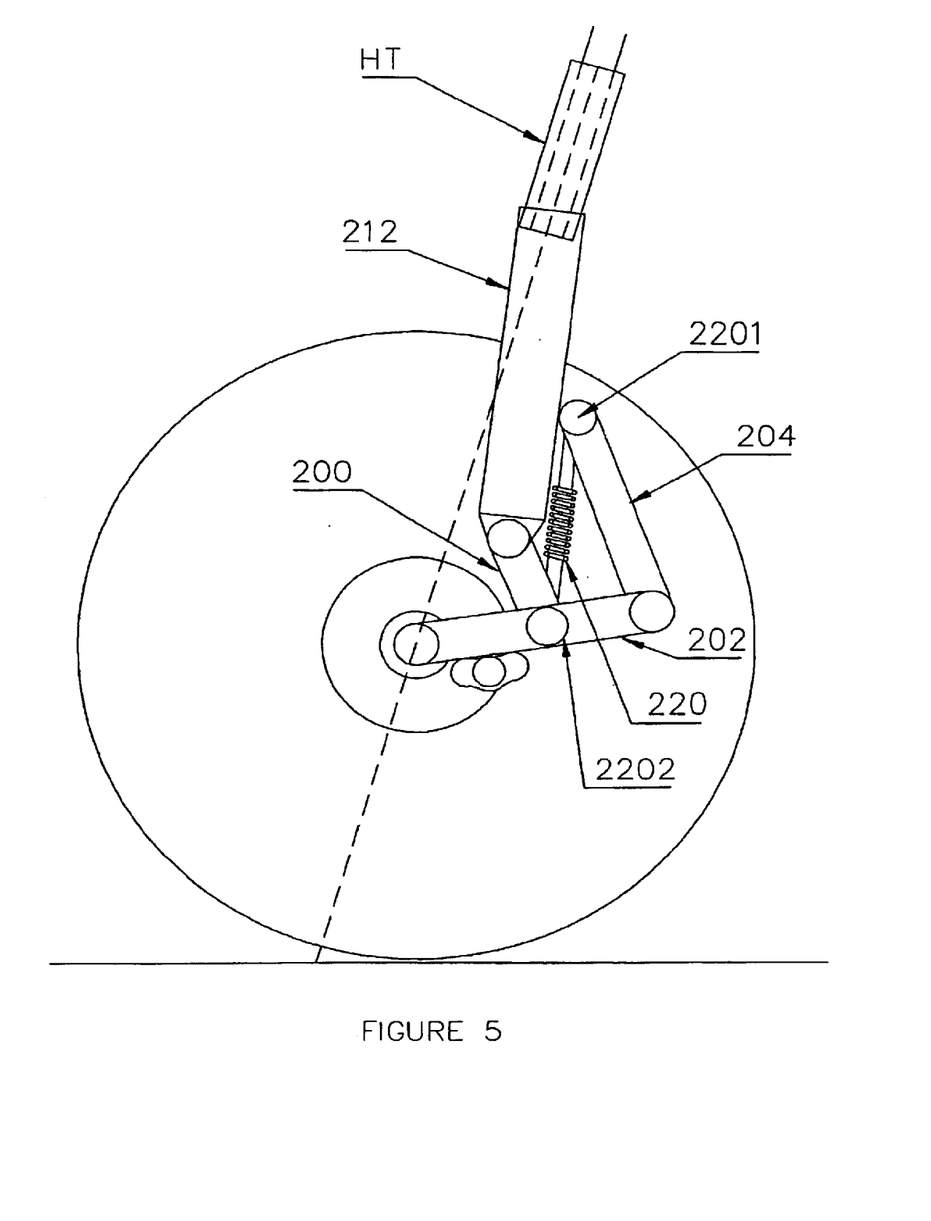
FIG. 5 is a side view of a third suspension of the invention

Turning on to FIG. 5, the suspension thereshown has a further, front link 200 between the bottom of the "outer" support tube 212 and the torque reaction arm 202. No inner connection tube is provided, the outer tube being pivotally connected to the front link. A rear link 204 is pivotally connected to the support tube at a position up the tube, but still within the wheel rim. It is also pivoted to the torque reaction arm, which is a leading arm. A spring and damper unit 220 is provided between the pivotal connection 2201 of the rear link and the support tube 212 and the connection 2202 of front link 200 and the torque reaction arm 202. The geometry is such that as the links swing back the front wheel rises and the spring is compressed. The inclination of the arm 202 becomes more shallow, providing the beneficial angle variance. The front link is shorter and more shallowly angled than the rear link to provide this. Braking torque tends to pivot the arm 202 about the front link and lift the support tube by the action of the rear link.

The invention is not intended to be restricted to the details of the above described embodiments. For instance the spring in the third embodiment could be arranged above the rear link acting between the rear end of the torque reaction arm and the support tube, with the rear link being connected to the support tube at a lower point than that shown in FIG. 5. Further in the FIG. 3 embodiment, where the support tube is shown with a rearwards inclination, this can be modified to be a forwards inclination with the head tube being inclined further back, still with the support tube being angled back with respect to the head tube as opposed to forwards as is conventional and shown in FIG. 2. In other alternatives:

a drum brake can be used in place of the disc brake illustrated;

the front wheel axle can be provided on the torque reaction arm between its point of connection to the support member and the connection to the rear link;

the moving portion of the telescopic connection to the torque reaction arm can be arranged outside the foot of the support member as opposed to inside it, whilst the spring remains inside.

Figure 6:
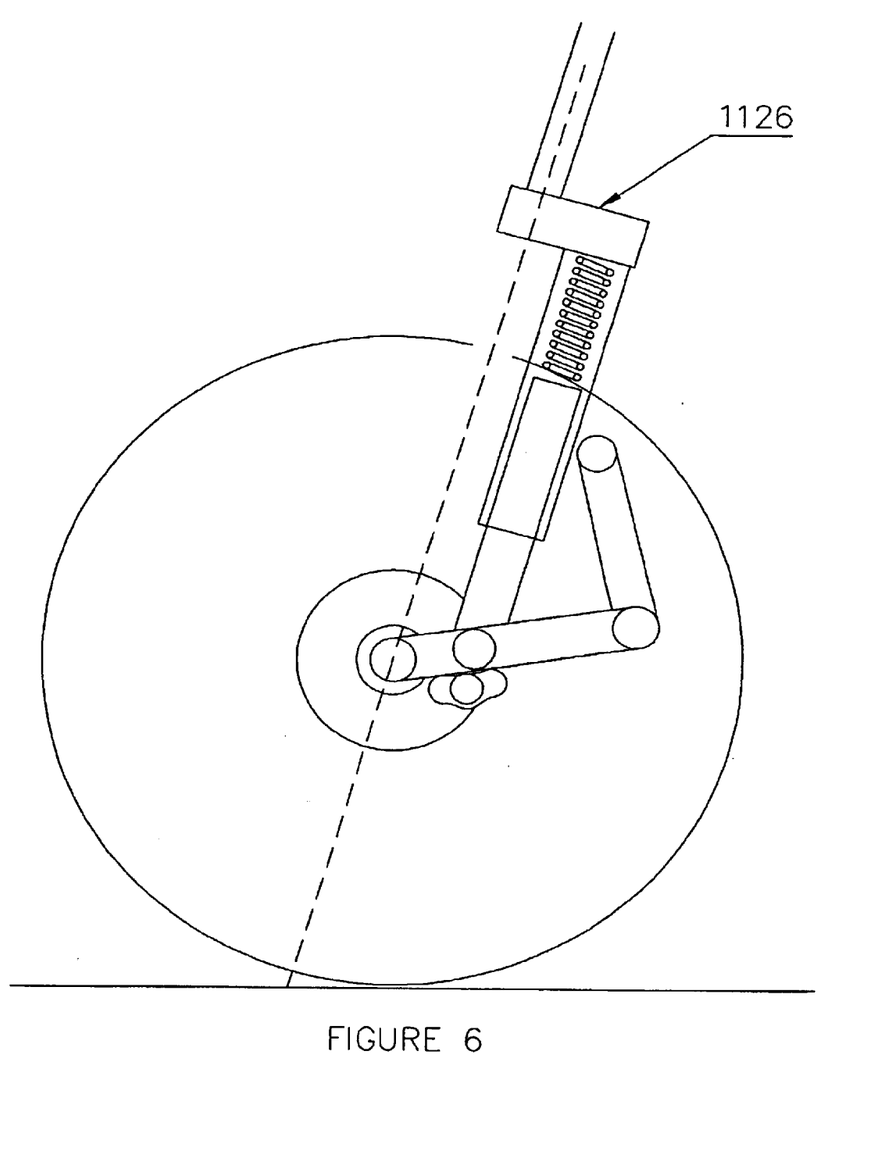
FIG. 6 is a side view showing a variant of the suspension of FIG. 4.

Another variant is shown in FIG. 6, wherein the means of achieving the castor trail with the leading arm anti-dive suspension of FIG. 4 is varied. It is inconvenient in adapting an existing bicycle to vary the head tube angle, thus the steering axis is fixed. In this variant, the suspension and wheel are moved as one to place the tyre contact patch in the desired position. This is achieved by cranking the support tube backwards. FIG. 6 shows the crank 1126.

What is claimed is:

1. An anti-dive front suspension for a bicycle having a frame with a head tube, comprising:
    a head tube shaft adapted to be steeringly mounted in the head tube;
    a suspension support member extending down from the head tube, whereby it is steerable in the bicycle;
    a torque reaction arm carrying a front wheel brake, such that braking torque may be reacted to the arm, wherein the torque reaction arm includes a rear end, and a length thereof from a front wheel axle to a pivotal connection thereof to a rear link;
    connecting means for connecting a forward portion of the torque reaction arm to the suspension support member;
    the front wheel axle being carried by the connecting means or the torque reaction arm, the front wheel axle being steeringly connected to the torque reaction arm;
    a suspension spring acting between the suspension support member and the connecting means or the torque reaction arm, the suspension spring being loaded by a wheel load tending to close the suspension;
    the rear link extending at an angle obliquely from the suspension support member to the rear end of the torque reaction arm where it is pivotally connected thereto, the connecting means and the rear link holding the torque reaction arm with a fore and aft component of direction in the bicycle, when steered straight ahead wherein the rear link includes ends; and
    steering angle transmitting bearings at the ends of the rear link connected respectively to the suspension support member and the torque reaction arm for transmitting a steering angle from the head tube shaft to the front wheel axle via the torque reaction arm;
    the suspension being such that braking torque applied to the torque reaction arm tends to rotate it to lift its rear end and open the suspension in an anti-dive manner;
    wherein the rear link is shorter than the length of the torque reaction arm from the front wheel axle to the pivotal connection to the rear link.

2. An anti-dive suspension according to claim 1, wherein the rear link is connected to the suspension support member at a point within a radius of a front wheel.

3. An anti-dive suspension according to claim 1, wherein the torque reaction arm is inclined downwards in a forwards direction, at least when the bicycle is unladen and standing on a level surface.

4. An anti-dive suspension according to claim 1, wherein the torque reaction arm is angled forwardly down when the bicycle is laden by a rider.

5. An anti-dive suspension according to claim 1, wherein the suspension support member is a single member cantilevered to one side of a front wheel.

6. An anti-dive suspension according to claim 1, wherein the suspension support member is a fork having two fork members on respective sides of a front wheel.

7. An anti-dive suspension according to claim 1, wherein the front wheel axle is carried on the torque reaction arm in front of the connection of the torque reaction arm to the connecting means, the suspension support member being angled back or cranked back from the head tube shaft to maintain castor trail.

8. An anti-dive suspension according to claim 1, wherein the connecting means includes a member slidably mounted on the suspension support member and pivotally connected to the torque reaction arm.

9. An anti-dive suspension according to claim 8, wherein the slidable member is telescopically accommodated in the suspension support member and the suspension spring is accommodated within the suspension support member.

10. An anti-dive suspension according to claim 9, wherein the rear link is connected to the suspension support member at a point where the slidable member extends within the suspension support member.

11. An anti-dive suspension according to claim 1, wherein the connecting means comprises a front link pivotally connected between the suspension support member and the torque reaction arm, and wherein the front link includes ends.

12. An anti-dive suspension according to claim 11, wherein the front link is shorter than the rear link.

13. An anti-dive suspension according to claim 11, wherein the front link is more shallowly angled than the rear link.

14. An anti-dive suspension as according to claim 11, wherein steering angle transmitting bearings are provided at the ends of the front link.

15. An anti-dive suspension according to claim 1, wherein the connecting means includes steering angle transmitting bearings at the ends of the rear link and a front link, provided for transmitting a steering angle from the head tube shaft to the front wheel axle.

16. An anti-dive suspension according to claim 1, wherein a geometry of the anti-dive suspension is such that an angle variance of the torque reaction arm is between 0.05° and 0.30° per mm wheel stroke.

17. An anti-dive suspension according to claim 16, wherein the angle variance is between 0.14° and 0.19° per mm.

18. An anti-dive suspension according to claim 1, wherein an angle variance of the torque reaction arm is between 0.09°°and 0.13° per mm.

* * * * *

UNITED STATES PATENT AND TRADEMARK OFFICE
CERTIFICATE OF CORRECTION

PATENT NO. : 6,896,276 B1
DATED : May 24, 2005
INVENTOR(S) : Roger Lionel David Sparrow It is certified that error appears in the above-identified patent and that said Letters Patent is hereby corrected as shown below:

Column 1,
Line 2, insert -- BACKGROUND OF THE INVENTION --.
Line 15, delete first occurrence of "No.".
Line 26, insert -- SUMMARY OF THE INVENTION --.
Line 28, after "provided" delete "." (period).

Column 2,
Line 24, delete "will".
Line 37, delete "such rider" and insert -- such as rider --.
Lines 43 through 46, delete.
Line 46, insert -- BRIEF DESCRIPTION OF THE DRAWINGS --.
Line 59, insert
-- DETAILED DESCRIPTION OF THE PREFERRED EMBODIMENTS
To help understanding of the invention, three specific embodiments of the invention will now be described by way of example and with reference to the accompanying drawings. --.

Column 5,
Line 49, delete first occurrence of "the" and insert -- a --.

Signed and Sealed this

Twentieth Day of September, 2005

JON W. DUDAS
*Director of the United States Patent and Trademark Office*